(12) United States Patent
Weigert et al.

(10) Patent No.: US 12,180,630 B2
(45) Date of Patent: Dec. 31, 2024

(54) INSTALLATION AND METHOD FOR PRODUCING A SINGLE- OR MULTI-LAYER NONWOVEN

(71) Applicants: TRÜTZSCHLER GROUP SE, Mönchengladbach (DE); VOITH PATENT GMBH, Heidenheim (DE)

(72) Inventors: Thomas Weigert, Sulzbach (DE); Kai Pöhler, Vettweiss (DE); Sven Thomßen, Schwanewede (DE)

(73) Assignees: TRÜTZSCHLER GROUP SE, Mönchengladbach (DE); VOITH PATENT GMBH, Heidenheim (DE)

( * ) Notice: Subject to any disclaimer, the term of this patent is extended or adjusted under 35 U.S.C. 154(b) by 358 days.

(21) Appl. No.: 17/791,848

(22) PCT Filed: Dec. 3, 2020

(86) PCT No.: PCT/EP2020/084374
§ 371 (c)(1),
(2) Date: Nov. 2, 2022

(87) PCT Pub. No.: WO2021/139932
PCT Pub. Date: Jul. 15, 2021

(65) Prior Publication Data
US 2023/0051101 A1   Feb. 16, 2023

(30) Foreign Application Priority Data
Jan. 10, 2020   (DE) .......................... 102020100424.9

(51) Int. Cl.
*D04H 18/04*   (2012.01)
*B32B 5/02*   (2006.01)
(Continued)

(52) U.S. Cl.
CPC ............. *D04H 18/04* (2013.01); *B32B 5/022* (2013.01); *B32B 5/067* (2021.05); *B32B 5/266* (2021.05);
(Continued)

(58) Field of Classification Search
CPC ........ D04H 18/04; D04H 1/465; D04H 1/492; D04H 1/495; D04H 5/03; D04H 1/4374;
(Continued)

(56) References Cited

U.S. PATENT DOCUMENTS 3,485,706 A * 12/1969 Evans .................... D04H 1/495
162/204
6,460,233 B2 * 10/2002 Noelle .................. D04H 1/492
28/104

(Continued)

FOREIGN PATENT DOCUMENTS

DE   102015112955 A1   10/2016
DE   102016217400 A1 * 10/2017
(Continued)

OTHER PUBLICATIONS

International Search Report in corresponding International Patent Application No. PCT/EP2020/084374, mail date Mar. 16, 2021, 5 pages with English Translation.

*Primary Examiner* — Amy Vanatta
(74) *Attorney, Agent, or Firm* — FisherBroyles, LLP; Robert Kinberg (57) ABSTRACT

An installation and a method for selectively producing a single-ply or alternatively a multi-ply nonwoven includes an inclined wire former configured to deposit a sheet of wet-laid fibre material on a first circulating belt, a further belt configured to receive the sheet of wet-laid fibre material from the first circulating belt, a roller card arranged downstream in the material transport direction and configured to
(Continued)

introduce a roller card web into the installation, a hydroentanglement arranged downstream in the material transport direction and including at least one water beam configured to entangle, bond and/or structure a single sheet of fibres or a plurality of sheets of fibres, and a dryer arranged downstream in the material transport direction.

11 Claims, 4 Drawing Sheets

(51) Int. Cl.
| | |
|---|---|
| *B32B 5/06* | (2006.01) |
| *B32B 5/26* | (2006.01) |
| *B32B 37/00* | (2006.01) |
| *D01G 15/04* | (2006.01) |
| *D04H 1/4374* | (2012.01) |
| *D04H 1/49* | (2012.01) |
| *D04H 1/492* | (2012.01) |
| *D04H 1/498* | (2012.01) |
| *D04H 1/4258* | (2012.01) |
| *D04H 1/4291* | (2012.01) |
| *D04H 1/4334* | (2012.01) |
| *D04H 1/435* | (2012.01) |

(52) U.S. Cl.
CPC ...... *B32B 37/0038* (2013.01); *B32B 37/0053* (2013.01); *D01G 15/04* (2013.01); *D04H 1/4374* (2013.01); *D04H 1/49* (2013.01); *D04H 1/492* (2013.01); *D04H 1/498* (2013.01); *B32B 2250/20* (2013.01); *B32B 2262/0253* (2013.01); *B32B 2262/0261* (2013.01); *B32B 2262/0276* (2013.01); *B32B 2262/144* (2021.05); *B32B 2317/10* (2013.01); *B32B 2323/10* (2013.01); *B32B 2367/00* (2013.01); *B32B 2377/00* (2013.01); *D04H 1/4258* (2013.01); *D04H 1/4291* (2013.01); *D04H 1/4334* (2013.01); *D04H 1/435* (2013.01); *D10B 2201/24* (2013.01); *D10B 2321/022* (2013.01)

(58) Field of Classification Search
CPC ........ D04H 1/49; D04H 1/498; D04H 1/4258; D04H 1/4291; D04H 1/4334; D04H 1/435; D04H 13/00; B32B 5/022; B32B 5/067; B32B 5/266; B32B 37/0038; B32B 37/0053; B32B 2250/20; B32B 2262/0253; B32B 2262/0261; B32B 2262/0276; B32B 2262/144; B32B 2317/10; B32B 2323/10; B32B 2367/00; B32B 2377/00; B32B 5/06; B32B 5/271; B32B 2250/02; B32B 2250/03; B32B 2250/04; D01G 15/04
USPC .................................................. 28/104, 105
See application file for complete search history.

(56) References Cited

U.S. PATENT DOCUMENTS

| | | | |
|---|---|---|---|
| 6,836,937 B1 * | 1/2005 | Boscolo | D04H 5/03 28/103 |
| 11,761,130 B2 * | 9/2023 | Noelle | D04H 1/74 28/104 |
| 2002/0148085 A1 * | 10/2002 | Fleissner | D06B 11/0056 28/104 |
| 2002/0168910 A1 * | 11/2002 | Vuillaume | D04H 3/153 442/385 |
| 2003/0106195 A1 * | 6/2003 | Fleissner | D04H 13/00 28/104 |
| 2005/0091811 A1 * | 5/2005 | Billgren | D04H 5/02 28/104 |
| 2007/0000107 A1 * | 1/2007 | Jeambar | D04H 1/492 162/157.1 |
| 2007/0067973 A1 * | 3/2007 | Conner | D04H 1/498 28/104 |
| 2009/0276978 A1 * | 11/2009 | Schmidt | B32B 5/26 19/302 |
| 2018/0112339 A1 * | 4/2018 | Weigert | D04H 18/04 |
| 2023/0026339 A1 * | 1/2023 | Weigert | B32B 5/06 |
| 2023/0340709 A1 * | 10/2023 | Vomhof | D04H 1/732 |

FOREIGN PATENT DOCUMENTS

| | | | |
|---|---|---|---|
| DE | 102016217401 A1 * | 10/2017 | |
| EP | 1929080 B1 | 4/2009 | |
| EP | 3118361 A1 | 1/2017 | |

* cited by examiner

INSTALLATION AND METHOD FOR PRODUCING A SINGLE- OR MULTI-LAYER NONWOVEN

CROSS-REFERENCE TO RELATED APPLICATIONS

This application is a United States National Stage Application of International Application No. PCT/EP2020/084374 filed Dec. 3, 2020, claiming priority from German Patent Application No. 10 2020 100 424.9 filed Jan. 10, 2020.

BACKGROUND

The invention relates to an installation and a method for producing a single- or multi-ply nonwoven.

It is known from EP 1929080 B1 to bond loose fibres with a web, in which the loose fibres are always supported and guided from beneath by a belt and at the same time are deposited on a web. This method and the associated installation are very complex because the belts must be guided absolutely in parallel over a relatively long portion. This is very complex to implement structurally because a constant tension is required between the belts and the two belts must have an identical speed at every point so as not to introduce uncontrolled distortions into the end product.

EP3118361 A1 discloses a roller card apparatus, downstream of which in the material flow direction there is arranged a wet-laid apparatus. In order to apply a layer of wet fibres to the non-entangled roller card web, an entangling device for the roller card web is arranged between the roller card apparatus and the wet-laid apparatus.

DE 102015112955 A1 discloses a wet-laid apparatus which deposits a single or multi-layer wet fibre material upside down on a transport belt. The wet fibre material is then deposited on a web which is introduced into the apparatus by means of an unwinding station or roller card apparatus beneath the transport belt for the fibre material.

SUMMARY

An object of the present invention is to provide an installation and a method for producing a single- or multi-ply nonwoven which is flexible in use and with which both wet-laid fibres and a roller card web can be processed alternatively or together.

The above and other objects are achieved according to one aspect of the invention by one embodiment of an installation for selectively producing either a single ply or a multi-ply nonwoven, comprising: an inclined wire former configured to deposit a sheet of wet-laid fibre material on a first circulating belt for transporting the sheet of wet-laid fibre material in a material transport direction, wherein the sheet of wet-laid fibre material is one of a single and multi-layer of wet-laid fibre material: at least one further belt configured to receive the sheet of wet-laid fibre material from the first circulating belt and to transport the sheet of wet-laid fibre material in the material transport direction: a roller card arranged downstream in the material transport direction at least partly and configured to introduce a roller card web into the installation, wherein the at least one further belt is located at least in part beneath the roller card: a hydroentangler arranged downstream in the material transport direction and having at least one water beam configured to at least one of entangle, bond and structure a single sheet of fibres or a plurality of sheets of fibres; and a dryer arranged downstream in the material transport direction from the hydroentangler: wherein either one or both of the sheet of wet-laid fibre and the roller card web comprise single ply nonwoven and the installation is configured to enable selective transport by the at least one further belt to the entangler of one of the sheet of wet-laid fibre material, the roller card web, and the sheet of wet-laid fibre material together with the roller card web.

According to this exemplary embodiment, the installation is configured to process the wet-laid sheet of fibre material or the roller card web or alternatively the sheet of fibre material with the roller card web. It is thereby not necessary to deposit the wet-laid sheet of fibre material upside down on a transport belt or a web. Preferably, the wet-laid sheet of fibre material can be of multi-layer form and can be processed either alone or in combination with the roller card web. The installation is so flexible that, by switching off the inclined wire former, only the roller card web is entangled and/or structured in the hydroentangler.

The sheet of fibre material can thereby be transported by means of the at least one belt directly to the hydroentangler. The arrangement of the inclined wire former and the roller card is such that they can both produce a single-ply nonwoven independently of one another. The single-ply nonwoven can consist of the sheet of fibre material, which can be of either single-layer or multi-layer form, or alternatively only of the roller card web.

The inclined wire former is arranged first in the material transport direction, followed by the roller card apparatus. The belt for transporting the sheet of fibre material is thereby arranged at least in part beneath the roller card. The belt can thereby be guided under the floor or can be arranged between the supports of the roller card.

An addition to this installation configuration provides that there is arranged upstream of the inclined wire former in the transport direction of the sheet of fibre material or beneath the inclined wire former an unwinding station with which, alternatively to the sheet of fibre material, a further first web can be introduced into the installation. The roller card web can thus be combined with a further first web which consists, for example, of long fibres with a fibre length ≥40 mm, processing of which with an inclined wire former is not expedient.

There is preferably arranged between the belt and the dryer at least one further circulating belt which is associated with the hydroentangler. The arrangement of a plurality of transport belts between the inclined wire former and the dryer makes it possible to arrange one or more unwinding stations, so that one or more further second webs can be introduced into the installation between the belts.

Preferably at least two belts are arranged upstream of the hydroentangler, between which belts there is arranged a further unwinding station which is configured to introduce a second web into the installation.

The installation is thus configured to produce a single-ply nonwoven, which can consist of four sheets of different fibres, namely of the sheet of fibre material, or of the roller card web, or of the first web, which is arranged upstream of or beneath the inclined wire former, or of the second web, which is introduced into the installation between the belts upstream of the dryer.

The installation is preferably configured to produce a two-ply nonwoven, which can consist of the sheet of fibre material with the roller card web or with the first web or with the second web. Alternatively, a two-ply nonwoven of the roller card web with either the first web or the second web is also possible. Alternatively, a two-ply nonwoven of the first web with the second web is possible.

The installation is preferably configured to produce a three-ply nonwoven, which can consist of the sheet of fibre material with the roller card web and the second web, or of the sheet of fibre material with the roller card web and the first web, or of the second web with the roller card web and the first web.

The installation is preferably configured to produce a four-ply nonwoven, which consists of the sheet of fibre material with the first web and the roller card web and the second web as the cover layer.

The method according to the invention for producing a single- or multi-ply nonwoven provides that a sheet of fibre material and/or a first web and/or a roller card web and/or a second web is deposited on a circulating belt and, alone or in combination with one of the above-mentioned sheets of fibre material or webs, is supplied in the form of a single- to four-ply nonwoven to a hydroentangler for bonding and/or entangling and/or structuring and is subsequently dried.

The hydroentangler is configured to entangle, bond and/or structure a single web or a plurality of layers of fibres or a plurality of webs. The water beams of the hydroentangler are preferably configured to spray the water onto the fibre sheet at a pressure of from 40 to 400 bar. By means of a specially configured nozzle assembly or in combination with an upper structured belt with which the sheet of fibre material and/or the web is enclosed, structuring and thus a pattern-giving surface of the web is possible. Alternatively, entangling and structuring can also be carried out on a cylinder (not shown) which is fitted with a structured jacket and is arranged upstream of the dryer.

There is obtained a very flexible installation in which different fibres with different fibre lengths in different weights per unit area can be introduced and processed individually or together. The arrangement of an inclined wire former and a roller card arranged downstream in the material transport direction is space-saving and, because the transport belt is guided beneath the roller card, is simple and inexpensive to implement. Part of the transport belt can, for example, be arranged concealed under the floor.

A reverse arrangement, that is to say arranging first the roller card and then the inclined wire former in a line in the material transport direction, can produce the same variation in terms of single- or multi-layer nonwovens but is associated with disadvantages owing to the web guiding of the roller card web and the feeding of the inclined wire former, although such an arrangement is more obvious because a roller card is often to be arranged upstream of the inclined wire former for reasons of space.

BRIEF DESCRIPTION OF THE DRAWINGS

Further measures enhancing the invention are described in detail below together with the description of a preferred exemplary embodiment of the invention with reference to the Figures, wherein.

DETAILED DESCRIPTION

The installation 100 according to the invention comprises at least one inclined wire former 1, at least one device, arranged downstream in the transport direction of the web, for introducing a further web, at least one hydroentangler which is arranged downstream and has at least one water beam 16, and a dryer 18.

An inclined wire former 1 is arranged beneath a circulating perforated belt 10. The perforated belt 10, which can be in the form of an endless belt, passes around various rolls 12 and has a sloping portion 11 which ascends at an angle in the running direction of the perforated belt. The inclined wire former 1, on the covering 2 of which the perforated belt 10 is supported, is arranged in the region of the sloping portion 11, beneath the perforated belt 10. Beneath the covering 2 there is arranged at least one suction zone 3 which is placed under low pressure by means of pumps (not shown). The inclined wire former 1 can have a plurality of suction zones 3 which are subjected to different pressures or low pressures. The low pressure sources can preferably be in the form of controllable/adjustable vacuum pumps.

In this exemplary embodiment, at least one or more fibre suspensions arranged one above the other are applied to the perforated belt 10 via a headbox 8. Each fibre suspension contains, in addition to water, a specific amount of solid material, which in turn consists of fibres and other added materials. In the case of a plurality of fibre suspensions, plates (not shown) are arranged between them, with which the layer thickness of the fibre suspensions can be varied individually or in total. Since the plates separate the fibre suspensions from one another, the fibre suspensions are dewatered on the inclined wire former 1 one after the other. Mixing of the fibre suspensions is thereby prevented and the ply purity of the individual layers of fibre material is improved. Via the at least one suction zone in conjunction with the controllable/adjustable vacuum pumps, each layer of a fibre suspension can be exposed to a separate low pressure, whereby different mixtures of water with fibres in each fibre suspension can be processed.

In this exemplary embodiment, the outer fibre suspensions, which on further processing form the outer layers or the cover layer for the middle layer of fibre suspension, can consist at least in part of short synthetic fibres with a fibre length of from 8 to 12 mm, such as, for example, polyester, polyamide, polypropylene or polyolefin. Fibre mixtures of synthetic and natural fibres are also possible. The outer layers can also consist of 100% pulp. The middle fibre suspension can consist of natural fibres, which have a high water retention capacity, and are preferably biodegradable.

The thickness of the plies is adjustable by the plates by varying the delivery of the fibre suspensions via the headbox 8. In the case of a sandwich nonwoven, for example, plies of equal thickness can be produced, or the plies can be produced with a graduation of, for example, 10%, 80% and 10% thickness. The weight per unit area of each ply of fibre material 9 can indirectly also be adjusted thereby.

It is of course also possible to deliver only one fibre suspension, so that a single ply of fibres forms after the removal of water. This fibre suspension can consist of a mixture of fibres with a high proportion of pulp and a smaller proportion of short synthetic fibres with a fibre length of from 8 to 12 mm, such as, for example, polyester, polyamide, polyolefin, polypropylene or viscose or lyocell. The weight per unit area of the dry web of fibre material 9 can preferably be from 10 to 60 g/m$^2$.

The perforated belt 10, which is permeable to liquids and gases, transports the at least one fibre suspension over the sloping portion 11 over the inclined wire former 1. Owing to gravity and the low pressure acting on the at least one fibre suspension, the fibre suspension is dewatered, whereby in this example a sheet of fibre material 9 with at least one ply of fibres is formed. Beneath the suction zone 3, the white water 6 is collected in a screen box 5 and removed.

The sheet of fibre material 9 is transported on the belt 10 in the direction indicated by the arrow, first over a horizontal portion and then further over a descending sloping portion. After the descending sloping portion, the sheet of fibre material 9 is transferred by its underside onto a further circulating belt 13, which passes in the form of an endless belt around at least two rolls 14.

Figure 1:
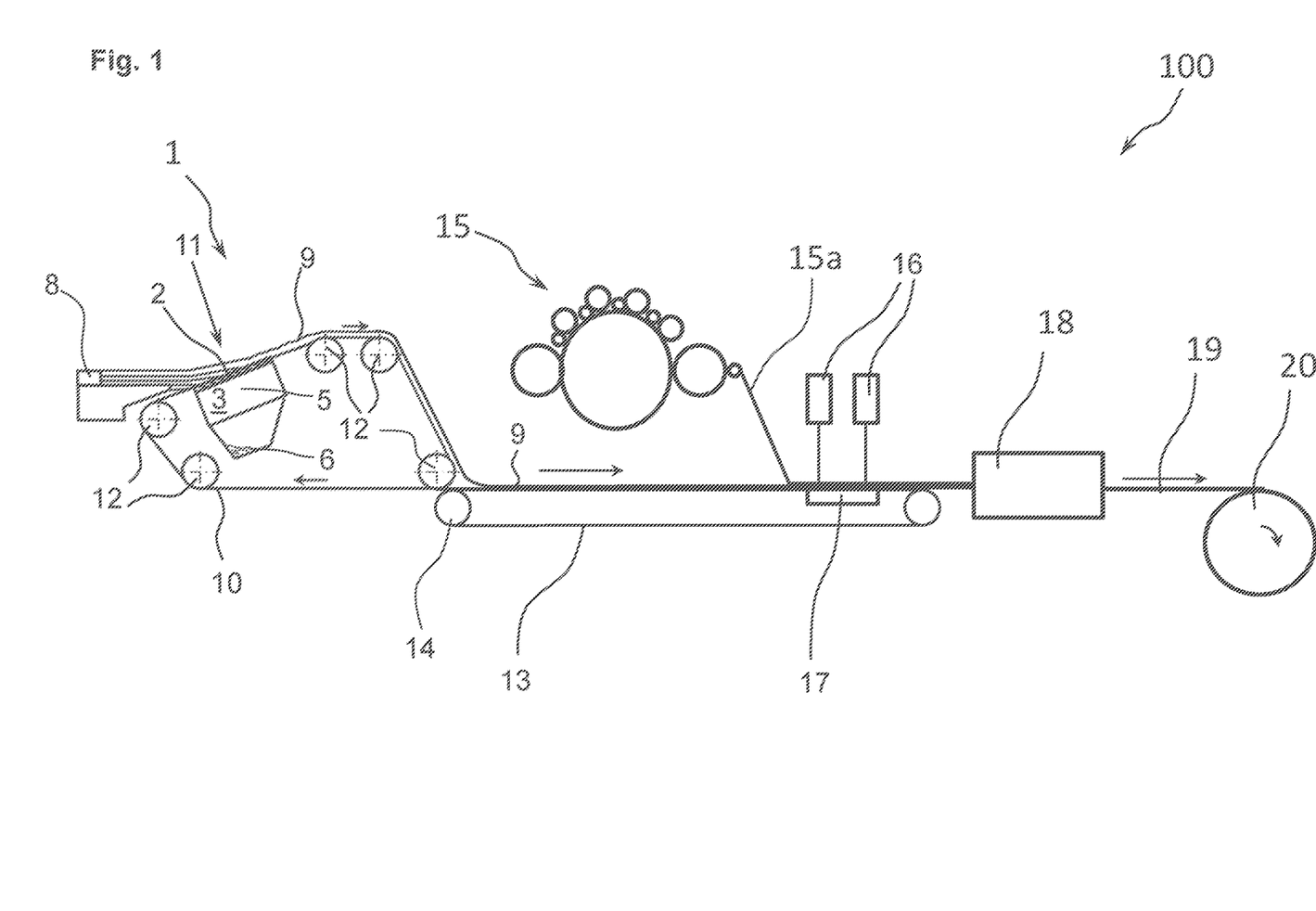
FIG. 1 shows a first embodiment of the installation according to the invention and of the method.

In the transport direction of the sheet of fibre material 9, a roller card 15 is arranged in the installation 100 in the first exemplary embodiment. The roller card 15 is arranged spatially above the belt 13, so that the wet-laid sheet of fibre material 9 can be guided independently of the roller card 15 to a hydroentangler having at least one water beam 16 and a suction means 17 arranged beneath the belt 13. Or, in other words, the belt 13 is guided beneath the stationarily installed roller card 15 and is configured to guide the sheet of fibre material 9 directly from the inclined wire former to the hydroentangler. The one or more layers from the headbox 8 are thereby entangled together. In the case of a plurality of layers there is obtained a multi-layer nonwoven 10 which, downstream of the hydroentangler, is dried in the dryer 18 and optionally wound in a winding station 20.

The roller card 15 can introduce a carded web of fibres, a roller card web 15a, into the installation 100. This takes place upstream of the hydroentangler, so that the sheet of fibre material 9 is bonded with the roller card web 15a by means of the water beams 16. The singleor multi-layer sheet of fibre material 9 can be bonded by the hydroentangler with a cover layer of a roller card web 15a to form a multi-ply nonwoven 19, which can be dried in the dryer 18 and optionally wound in a winding station. The roller card web 15a can consist, for example, of polyester, viscose, a cotton mixture or a mixture of synthetic and/or natural fibres. Preferably, the weight per unit area of the roller card web 15a is from 20 to 60 g/m².

According to this exemplary embodiment, the installation is configured to process the sheet of fibre material 9 or the roller card web 15a or alternatively the sheet of fibre material 9 together with the roller card web 15a.

Figure 2:
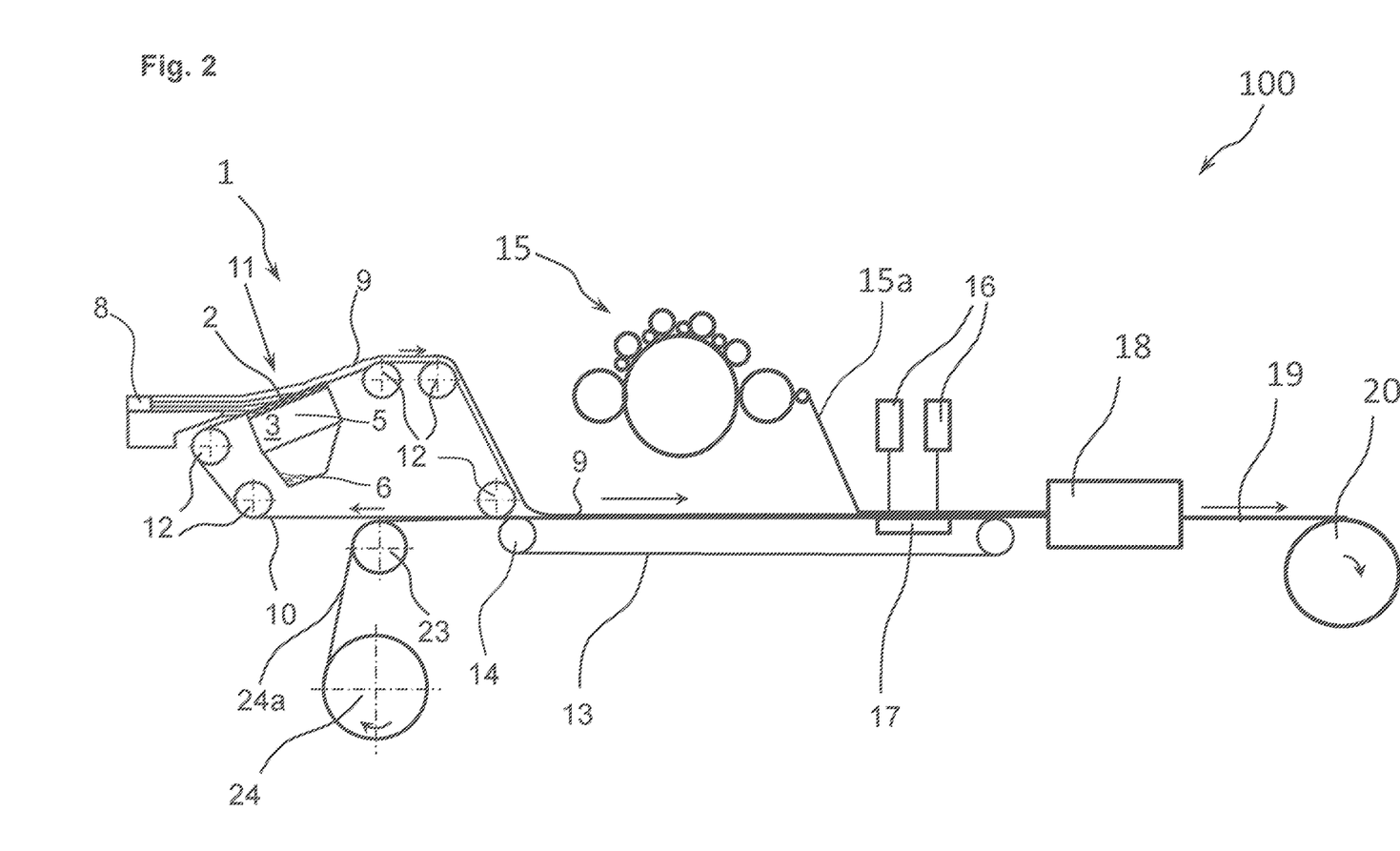
FIG. 2 shows a second embodiment of the installation according to the invention and of the method.

In the exemplary embodiment of FIG. 2, compared to the exemplary embodiment of FIG. 1, an unwinding station 24 with a roll 23 is additionally arranged upstream of the belt 13 in the transport direction of the sheet of fibre material 9. The unwinding station 24 can be arranged upstream of the inclined wire former 1 or beneath it (under the floor) and can introduce into the installation 100, alternatively or in addition to the wet-laid sheet of fibre material 9, a web of fibres as a web 24a. In a first embodiment relating to FIG. 2, owing to the arrangement of the unwinding station 24 and the running direction of the belt 10, only the sheet of fibre material 9 or the web 24a can be deposited on the belt 13 in this exemplary embodiment. If a second web 24a is introduced into the installation 100 instead of the sheet of fibre material 9, it can pass through the hydroentangler and the dryer 18 alone or together with the roller card web 15a and optionally be wound in the form of a nonwoven 19 at the winding station 20. Alternatively, the unwinding station 24 can be so arranged that the web 24a is deposited on the belt 13 between the deposition of the sheet of fibre material 9 and the roll 14. In this embodiment, a three-ply nonwoven 19 is accordingly possible, wherein the web 24a and the roller card web 15a form the cover plies for the sheet of fibre material 9. Depending on the embodiment, the web 24a can consist, for example, of polyester, viscose, a cotton mixture or a mixture of synthetic and/or natural fibres. If the web 24a is fed into the installation 100 as an alternative to the sheet of fibre material 9, a web of tissue or paper can also be used. Preferably, the weight per unit area of the web 24a is from 10 to 60 g/m².

According to this exemplary embodiment, the installation is configured to produce a single- or multi-layer or multi-ply nonwoven 19, which can consist only of the sheet of fibre material 9, or only of the web 24a, or only of the roller card web 15a, or of the sheet of fibre material 9 with the roller card web 15a, or of the web 24a with the roller card web 15a, or of the sheet of fibre material 9) with the roller card web 15 and the web 24a as cover plies. There are thus obtained material combinations of fibres with different weights per unit area having a different number of layers and/or from one to three plies. The installation 100 is thereby so configured that there is no overlapping of belts between which distortion of the nonwoven is possible owing to differences in speed, or such belts run in parallel.

Figure 3:
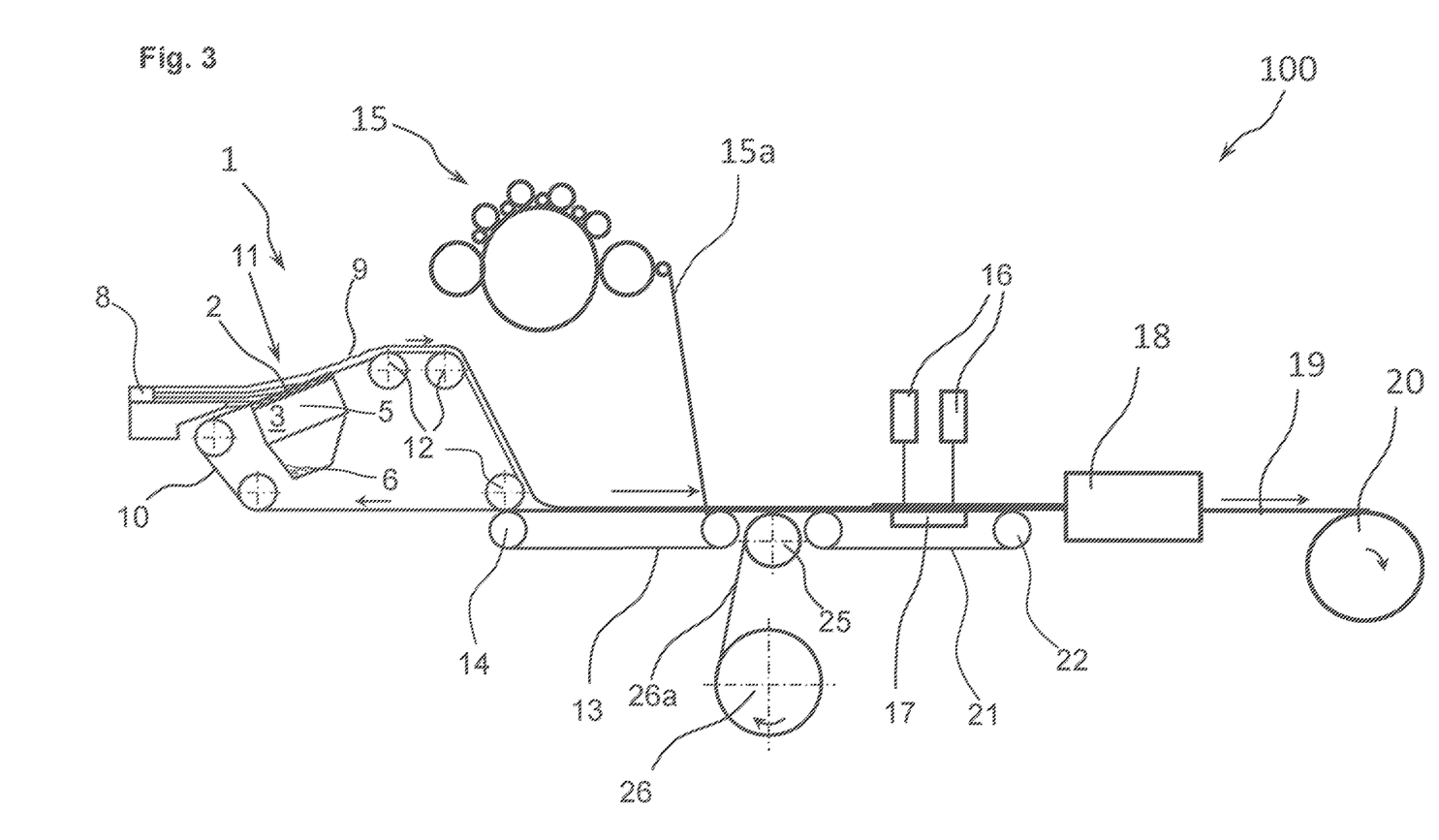
FIG. 3 shows a third embodiment of the installation according to the invention and of the method.

The exemplary embodiment of FIG. 3 differs from the exemplary embodiment of FIG. 1 by a further belt 21 for transporting the web. Between the belt 13 and the dryer 18, a further circulating belt 21, which is associated with the hydroentangler, is arranged around two rolls 22. At least one water beam 16 is arranged above the belt 21, and an associated suction means 17 is arranged beneath the belt 21. Between the belts 13 and 21 there is arranged a further unwinding station 26 having a roll 25, which unwinding station is arranged under the floor in this exemplary embodiment. In this embodiment, the sheet of fibre material 9 can be enclosed by an upper roller card web 15a and by a lower web 26a from the unwinding station 26, so that a three-ply nonwoven, for example, can be produced. The web 26a can, for example, as a roller card web consist of fibres of polypropylene, polyester or of viscose or of a fibre mixture of synthetic and/or natural fibres with a weight per unit area of from 10 to 50 g/m².

Alternatively, or in addition, a further unwinding station 26 can be arranged above the belt 13 upstream or downstream of the roller card 15 in the transport direction of the web and is configured to introduce a web of fibres or a further web into the installation 100.

There is obtained according to the invention a flexible installation for producing a single- or multi-layer or multi-ply nonwoven 19, which can consist only of the sheet of fibre material 9, or only of the roller card web 15a, or only of the web 26a. Alternatively, the nonwoven 19 can consist of two plies and in this case can consist only of the sheet of fibre material 9 with the roller card web 15a, or only of the sheet of fibres 9 with the web 26a, or only of the web 26a with the roller card web 15a. Alternatively, the nonwoven 19 can consist of three plies, namely of the sheet of fibre material 9 as the middle ply, the roller card web 15a as the upper ply and the web 26a as the lower ply.

There are thereby obtained material combinations of synthetic and/or natural fibres with different weights per unit area and with a different number of layers and/or one or two or three plies. The installation 100 is so configured that there is no overlapping of belts between which distortion of the nonwoven 19 is possible owing to differences in speed, or such belts run in parallel.

Figure 4:
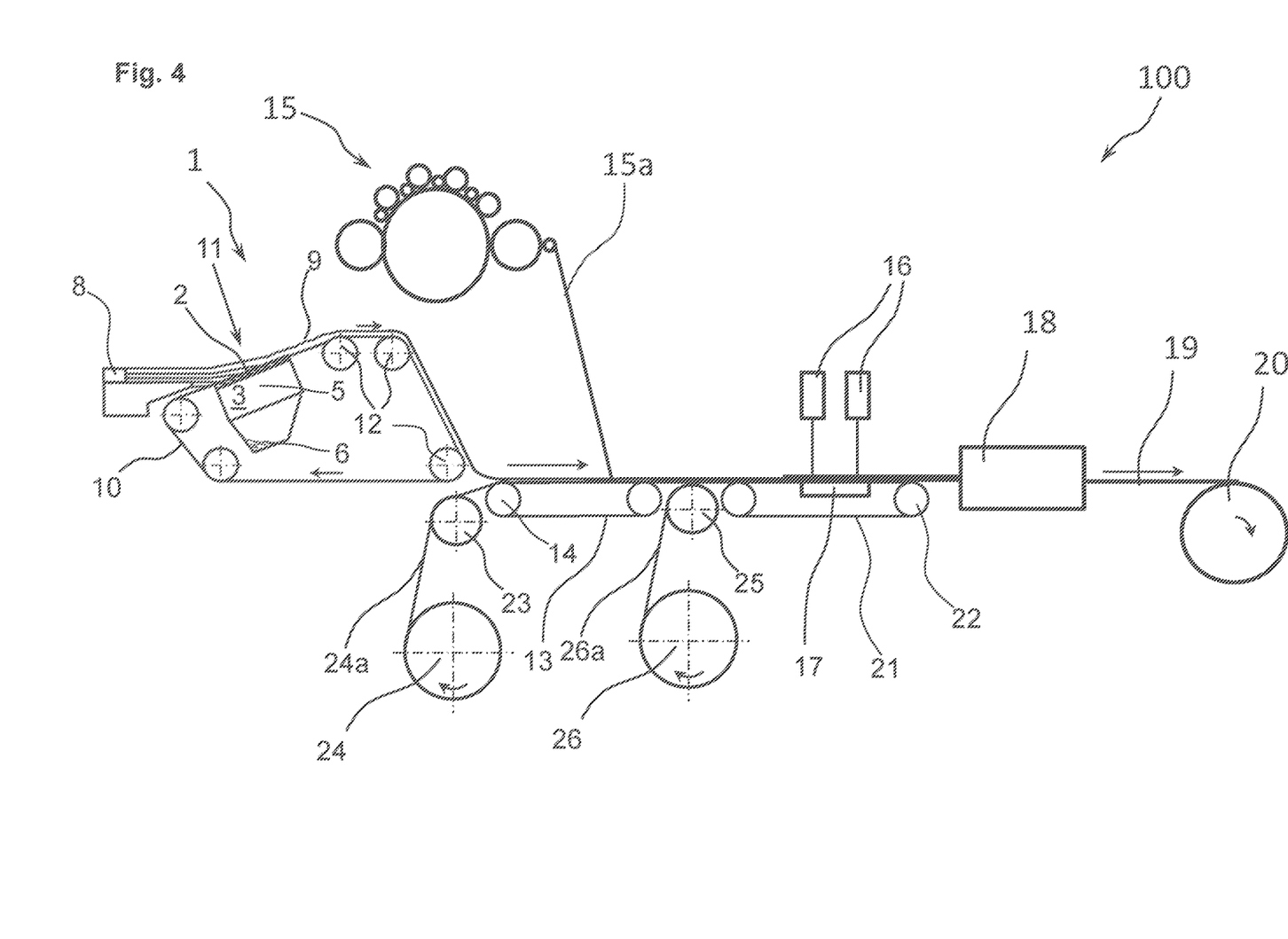
FIG. 4 shows a fourth embodiment of the installation according to the invention and of the method.

The exemplary embodiment of FIG. 4 combines the exemplary embodiment of FIG. 2 with that of FIG. 3, according to which the installation is configured to produce a single- to four-ply nonwoven 19, wherein a ply 9 can be of single- or multi-layer form.

There is obtained according to the invention a flexible installation for producing a single- or multi-layer or multi-ply nonwoven 19, which can consist only of the sheet of fibre material 9, or only of the web 24a, or only of the roller card web 15a, or only of the web 26a.

Alternatively, the nonwoven 19 can consist of two plies and can thereby consist only of the sheet of fibre material 9 with the roller card web 15a, or only of sheet of fibres 9 with the web 26a, or only of the sheet of fibres 9 with the web 24a, or only of the web 24a with the roller card web 15a, or only of the web 24a with the web 26a, or only of the web 26a with the roller card web 15a.

Alternatively, the nonwoven 19 can consist of three plies, namely of the sheet of fibre material 9 as the middle ply, the roller card web 15a as the upper ply and the web 26a as the lower ply. Furthermore, the nonwoven 19 can consist of the web 24a as the middle ply, the roller card web 15a as the upper ply and the web 26a as the lower ply. Alternatively, the nonwoven 19 can also consist of the sheet of fibre material 9 with the web 24a and the roller card web 15a or the web 26a.

A four-ply nonwoven can consist of the sheet of fibre material 9 with the web 24a as the middle ply and the webs 26a and 15a as the cover ply. Preferably, the weight per unit area of the nonwoven 19 is from 45 to 65 g/m$^2$.

There are thereby obtained material combinations of synthetic or natural fibres with different weights per unit area and with a different number of layers and/or from one to four plies. The installation 100 is so configured that there is no overlapping of belts between which distortion of the nonwoven is possible owing to differences in speed, or such belts run in parallel.

The invention claimed is:

1. An installation for selectively producing either a single-ply or a multi-ply nonwoven, comprising:
    an inclined wire former configured to deposit a sheet of wet-laid fibre material on a first circulating belt for transporting the sheet of wet-laid fibre material in a material transport direction, wherein the sheet of wet-laid fibre material is one of a single and multi-layer wet-laid fibre material;
    at least one further belt configured to receive the sheet of wet-laid fibre material from the first circulating belt and to transport the sheet of wet-laid fibre material in the material transport direction;
    a roller card arranged downstream in the material transport direction and configured to introduce a roller card web into the installation, wherein the at least one further belt is located at least in part beneath the roller card,
    a hydroentangler arranged downstream in the material transport direction and having at least one water beam configured to at least one of entangle, bond and structure a single sheet of fibres or a plurality of sheets of fibres;
    and a dryer arranged downstream in the material transport direction from the hydroentangler,
    wherein either one or both of the sheet of wet-laid fibre and the roller card web comprise single-ply nonwoven and the installation is configured to enable selective transport by the at least one further belt to the hydroentangler of one of the sheet of wet-laid fibre material, the roller card web, and the sheet of wet-laid fibre material together with the roller card web.

2. The installation according to claim 1, further including an unwinding station arranged at least one of upstream of the at least one further belt and beneath the inclined wire former for selectively introducing into the installation, in addition or alternatively to the sheet of wet-laid fibre material a first additional web.

3. The installation according to claim 2, wherein the at least one further belt includes a first circulating belt and a further circulating belt arranged between the first circulating belt and the dryer and running through the hydroentangler.

4. The installation according to claim 3, further comprising a second unwinding station arranged downstream of the first circulating belt and upstream of the hydroentangler and configured to introduce at least one second additional web into the installation.

5. The installation according to claim 4, wherein the installation is configured to selectively produce a single-ply nonwoven, which consists of one of the sheet of wet-laid fibre material, the roller card web, the first additional web and the second additional web.

6. The installation according to claim 4, wherein the installation is configured to selectively produce one of a two-ply nonwoven, consisting of one of the sheet of wet-laid fibre material with the roller card web, the sheet of wet-laid fibre material with the second additional web, the roller card web with the second additional web, the roller card web with the first additional web, and the first additional web with the second additional web.

7. The installation according to claim 4, wherein the installation is configured to produce a three-ply nonwoven, which consists of one of the sheet of wet-laid fibre material with the roller card web and the second additional web, and the second additional web with the roller card web and the first additional web.

8. The installation according to claim 4, wherein the installation is configured to produce a four-ply nonwoven which consists of the sheet of wet-laid fibre material with the first additional web, the roller card web and the second additional web as a cover layer.

9. A method for producing a single- or multi-ply nonwoven, comprising the steps of:
    depositing a sheet of wet-laid fibre material on a first circulating belt;
    transporting the sheet of wet-laid fibre material downstream in a material transport direction to a further belt of a roller card;
    selectively depositing a roller card web from the roller card directly on one of further belt and the upper side of the sheet of the wet-laid fibre material being transported by the further belt;
    one of entangling, structuring and bonding by use of water jets one the wet-laid fibre material, the roller card web, and the roller card web on top of the wet-laid fibre material; and
    subsequently drying only one the sheet of wet-laid fibre material, the roller card web, and both the sheet of wet laid fibre material and the roller card web together.

10. The method according to claim 9, wherein the single- or multi-layer nonwoven comprises a first additional web and the method further includes one of entangling, structuring and bonding the first additional web alternatively or in addition to the sheet of wet-laid fibre material with the roller card web by use of water jets, and subsequently drying the same.

11. The method according to claim 10, wherein the single- or multi-layer nonwoven comprises a second additional web on which the sheet of wet-laid fibres or the first additional web rests with its underside, and the method further includes one of entangling, structuring and bonding the second additional web alternatively or in addition to the sheet of wet-laid fibre material with the roller card web and the first additional web by use of water jets, and subsequently drying the same.

* * * * *